(12) United States Patent
Nicholas

(10) Patent No.: US 8,324,285 B2
(45) Date of Patent: Dec. 4, 2012

(54) HYDROPHOBIC AND/OR OLEOPHOBIC OPEN CELL POLYIMIDE ACOUSTIC AND THERMAL INSULATION FOAMS AND METHODS OF MAKING

(75) Inventor: George F. Nicholas, Marysville, WA (US)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 11/935,971

(22) Filed: Nov. 6, 2007

(65) Prior Publication Data
US 2009/0118384 A1 May 7, 2009

(51) Int. Cl.
| | |
|---|---|
| C08J 9/32 | (2006.01) |
| C08J 9/36 | (2006.01) |
| C08G 63/44 | (2006.01) |
| C08G 69/44 | (2006.01) |
| C08G 73/10 | (2006.01) |
| C08G 8/02 | (2006.01) |
| C08G 14/00 | (2006.01) |
| C08G 75/02 | (2006.01) |
| C08L 27/00 | (2006.01) |
| A61Q 19/00 | (2006.01) |
| C08K 5/24 | (2006.01) |

(52) U.S. Cl. ............ 521/54; 521/53; 521/185; 528/125; 524/520; 524/731

(58) Field of Classification Search .............. 524/520, 524/731; 521/53, 178, 54; 528/125
See application file for complete search history.

(56) References Cited

U.S. PATENT DOCUMENTS

| | | | |
|---|---|---|---|
| 4,474,858 A | 10/1984 | Makino et al. | |
| RE32,255 E * | 9/1986 | Gagliani et al. | 521/56 |
| 4,940,112 A | 7/1990 | O'Neill | |
| 5,030,518 A | 7/1991 | Keller | |
| 5,047,436 A * | 9/1991 | Hill et al. | 521/53 |
| 5,431,990 A * | 7/1995 | Haynes et al. | 428/218 |
| 5,472,760 A * | 12/1995 | Norvell | 428/71 |
| 5,514,726 A * | 5/1996 | Nichols et al. | 521/152 |

(Continued)

FOREIGN PATENT DOCUMENTS

DE 10011388 A1 * 11/2000

(Continued)

OTHER PUBLICATIONS

Machine Translation of DE 10011388, 2009.*

(Continued)

*Primary Examiner* — Liam Heincer
(74) *Attorney, Agent, or Firm* — Yee & Associates, P.C.

(57) ABSTRACT

Provided are methods of treating an open cell polyimide foam product to produce a treated polyimide foam product having a property of repelling water or oil. The method includes the steps of: selecting a polyimide foam product having an external surface area and an open cell structure that has an interior surface area, wetting the exterior surface area and the interior surface area with a chemical treatment fluid comprising a treatment chemical that has a property of repelling water or oil, and distributing the treatment chemical onto at least a portion of the interior surface area sufficient to modify a surface property of the interior surface. Also provided are treated polyimide foam products that have an open cell polyimide foam substrate with an interior surface area and a treatment chemical on at least a portion of the interior surface area. The treatment chemical renders the interior surface hydrophobic or oleophobic.

10 Claims, 1 Drawing Sheet

U.S. PATENT DOCUMENTS

| | | | |
|---|---|---|---|
| 5,670,758 A * | 9/1997 | Borchers et al. | 181/286 |
| 6,180,008 B1 | 1/2001 | White | |
| 6,235,803 B1 * | 5/2001 | Weiser et al. | 521/60 |
| 6,426,372 B1 * | 7/2002 | Minami et al. | 521/63 |
| 6,579,620 B2 * | 6/2003 | Mizuno et al. | 428/447 |
| 6,720,371 B2 | 4/2004 | Furuta et al. | |
| 6,800,679 B2 | 10/2004 | Wada et al. | |
| 7,008,993 B1 * | 3/2006 | Galen et al. | 524/520 |
| 7,019,069 B2 * | 3/2006 | Kobayashi et al. | 524/588 |
| 7,040,575 B2 | 5/2006 | Struve et al. | |
| 7,578,468 B2 | 8/2009 | Drost | |
| 2002/0165303 A1 * | 11/2002 | Wada et al. | 524/263 |
| 2003/0040568 A1 * | 2/2003 | Furuta et al. | 524/520 |
| 2005/0192397 A1 * | 9/2005 | Dadalas et al. | 524/520 |
| 2006/0145006 A1 * | 7/2006 | Drost | 244/118.5 |
| 2008/0280126 A1 * | 11/2008 | Lenz et al. | 428/319.3 |
| 2009/0061200 A1 * | 3/2009 | Hild et al. | 428/304.4 |

FOREIGN PATENT DOCUMENTS

| | | |
|---|---|---|
| GB | 2104905 A | 3/1983 |
| JP | 58 008735 A | 1/1983 |
| JP | 06 248108 A | 9/1994 |
| WO | WO 00/06293 A1 | 2/2000 |
| WO | WO 2008/107439 A1 | 9/2008 |
| WO | 2009061645 A2 | 5/2009 |

OTHER PUBLICATIONS

A New Alternative for Better Midification of Medical Surfaces and Textiles, Europlasma Technical Paper, May 8, 2004, Amsterdam.
Team Creates New Process for Waterproofing, News Office, http://web.mit.edu/newsoffice/2003/waterproff-0205.htm, Feb. 5, 2003.
Functionalization of Polymer Surfaces, Europlasma Technical Paper, Introduction of Functional Groups at Polymer Surfaces by Glow Discharge Techniques, J.G.A. Terlingen, Chapter 2, May 8, 2004, pp. 1-29.
PCT US2008/081508, International Search Report.
"A New Alternative for Better Midification of Medical Surfaces and Textiles", Europlasma Technical Paper, May 8, 2004, Amsterdam.
Plasma Technology, Europlasma Website, http://www.europlasma.be/pageview.aspx?id=181&mid=17.
Team Creates New Process for Waterproofing, News Office, http://www.mit.edu/newsoffice/2003/waterproof-0205.hhill, Feb. 5, 2003.
Surface Treatment Process Application for Hydrophobic Treatment of Foams, Europlasma Website, http://www.europlasma.be/pageview.aspx?id=199&mid=123.
"Functionalization of Polymer Surfaces, Europlasma Technical Paper, Introduction of Functional Groups at Polymer Surfaces by Glow Discharge Techniques", J.G.A. Terlingen, Chapter 2, May 8, 2004, pp. 1-29.

* cited by examiner

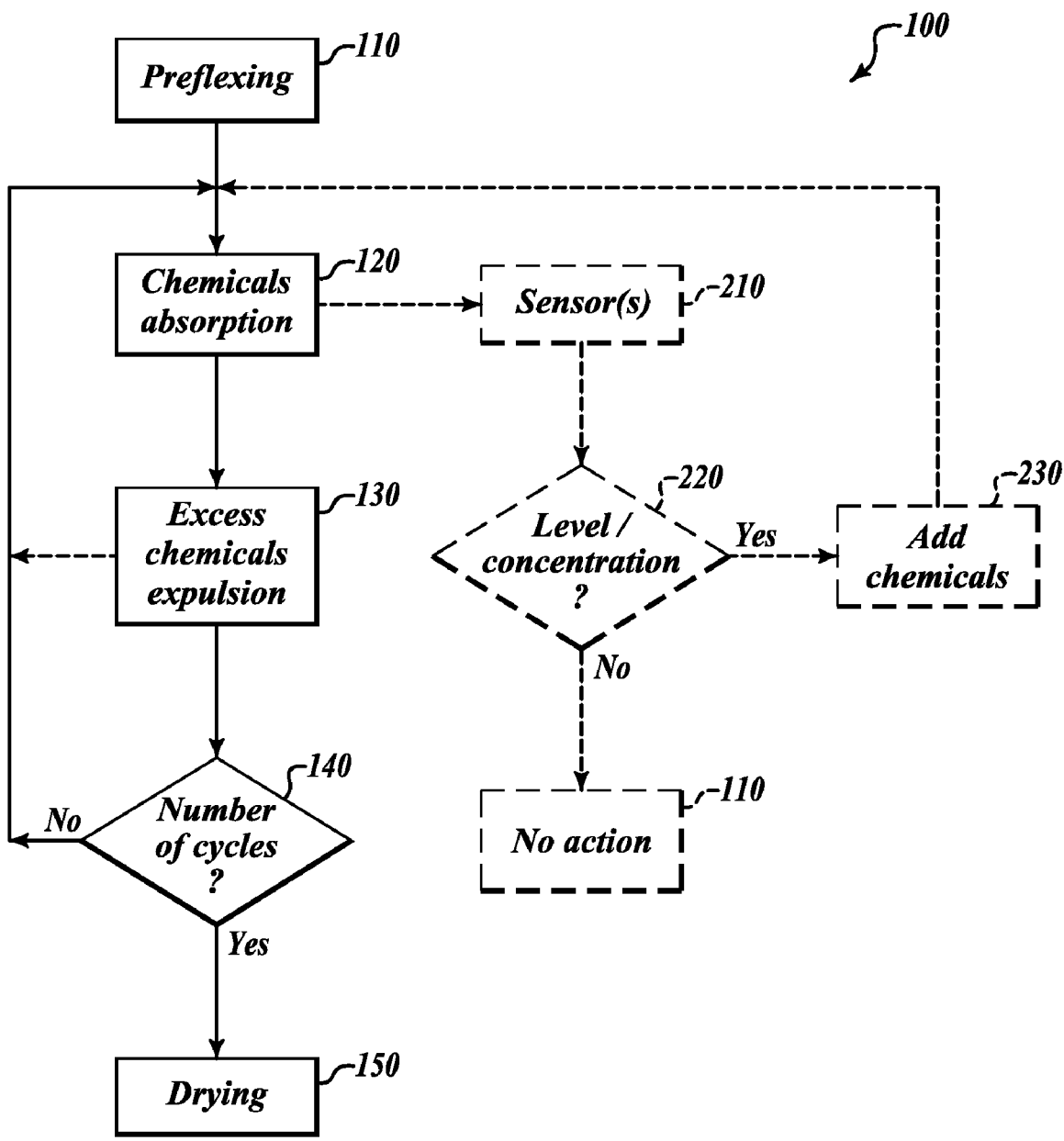

HYDROPHOBIC AND/OR OLEOPHOBIC OPEN CELL POLYIMIDE ACOUSTIC AND THERMAL INSULATION FOAMS AND METHODS OF MAKING

TECHNICAL FIELD

The embodiments described herein generally relate to open cell polyimide acoustic and thermal insulation foams, and more particularly relate to such foams rendered hydrophobic and or oleophobic through chemical treatment.

BACKGROUND

Polymer foams have found increasing use as thermal acoustic insulation materials. Low density, flexible open cell polymeric foams such as polyimide consist of gas bubbles dispersed in a solid phase, resulting in a highly porous cellular structure. Certain polyimide foams are characterized as "open cell," meaning that the majority of the cells in the network interconnect through open faces and the cell walls or edges (sometimes called struts) are the only solid component. Alternatively, "closed cell" foams consist of cells that are separate from each other with little or no interconnection between adjacent cells.

In the aerospace field, micro-porous reticular open cell polyimide foams may be used as both thermal and acoustic insulating materials. For instance, open cell polyimide foams enclosed in film ("bags") may be installed between the outer skin of commercial passenger aircraft and the passenger cabin interior panels, as well as in the lower interior portion of the aircraft (bilge, etc.). These bagged open cell polyimide foams would provide thermal insulation and also attenuate sound.

Untreated open cell polyimide foam does not resist the passage of liquids and gasses. The oleophilic and hydrophilic nature of this polyimide foam may cause water and oils to readily ingress into the foam. In certain applications there may be a need for imparting oil and water repellency (OWR) properties to low density open cell polyimide foam, for the purpose of reducing liquid absorption and retention.

BRIEF SUMMARY

An exemplary embodiment provides a method of treating an open cell polyimide foam product to produce a treated polyimide foam product having a property of repelling water or oil. The method includes the steps of: selecting a polyimide foam product having an external surface area and an open cell structure that has an interior surface area, wetting the exterior surface area and the interior surface area with a chemical treatment fluid comprising a treatment chemical that has a property of repelling water or oil, and distributing the treatment chemical onto at least a portion of the interior surface area sufficient to modify a surface property of the interior surface.

Another exemplary embodiment provides a treated polyimide foam product that has an open cell foam substrate with an interior surface area and a treatment chemical on at least a portion of the interior surface area. The treatment chemical renders the interior surface hydrophobic or oleophobic.

Yet another exemplary embodiment provides a treated polyimide foam product that has an open cell foam substrate of polyimide foam. The polyimide foam substrate has an interior surface area with a treatment chemical on at least a portion of the interior surface area. The treatment chemical is bonded to at least a portion of the interior surface to render the interior surface hydrophobic or oleophobic

BRIEF DESCRIPTION OF THE DRAWINGS

Various exemplary embodiments will hereinafter be described in conjunction with the following drawing figures, wherein like numerals denote like elements, and FIG. is a process flow diagram of an exemplary embodiment of a method of treating foam to produce a hydrophobic and/or oleophobic treated foam.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Exemplary embodiments of treated polyimide foam products are described herein with reference primarily to their use in commercial aircraft. However, of course, these exemplary treated polyimide foam products may be used in other applications as well, including for example automobiles, homes, factories, cryogenic pipes and tanks, and the like, in a variety of applications where the properties of treated polyimide foam products may be desirable. The term "open cell" as it relates to polyimide foam refers to any foam product that has primarily open cells as opposed to closed cells. The proportion of open cells may vary but should be sufficient to permit penetration of treatment chemicals into the foam product to such an extent as to yield desired properties in the treated foam product. Further, open cell polyimide foam products usually have serpentine channels or cells that interconnect throughout an internal body of the foam product. These serpentine channels or cells have surfaces that provide the foam products with large interior surface area relative to external surface area. Moreover, the internal cells are filled with air, if in an air environment, and this air filling contributes to the properties of thermal and acoustic insulation.

Exemplary embodiments of treated polyimide foam products include those foams that are used as thermal insulation foams as well as those that are used as acoustic insulation. Of course, many types of polyimide foam inherently have both thermal and acoustic insulation properties. Upon treatment, according to exemplary methods, the treated polyimide foam products may be hydrophobic (water repellant) or oleophobic (oil repellant) or both, depending upon the type of treatment applied.

Polyimide foam constitutes an embodiment of an open cell foam type that may be treated to make it hydrophobic and/or oleophobic. A particular polyimide foam known as Solimide® (trademark of Evonik Industries AG of Essen, Germany) has properties of fire-resistance, low smoke and toxic gas production, wide operating temperature range, and very low weight. Accordingly, it is suitable for use in thermal and acoustic insulation in commercial aircraft.

In general, a treatment chemical to introduce hydrophobic and/or oleophobic foam properties should not be harmful to polyimide foam; i.e. it should not be deleterious to any significant extent to other desired properties of the foam and should not degrade the foam physically or chemically to any significant extent. Thus, for example, it should not adversely affect acoustic properties to any significant extent for foam intended for an acoustic application, and it should not adversely affect thermal insulation properties to any significant extent for foam intended for a thermal insulation application.

Further, in general, the treatment chemical should be stable and reside on at least those surfaces of open cells of the foam that are exposed to a surrounding environment that contains moisture. The treatment chemical may bond to the foam surfaces (cellular struts) through physical and or chemical adhesion.

An important class of industrial water repellents are the co-polymer perfluoroacrylates (co-monomers, being esters of alkyl and substituted alkyl groups containing acrylic and methacrylic acids), which impart both oil and water repellency (OWR) to polyimide open cell foams. After application of these perfluorocarbon chemicals, the treated foam may be subjected to heating (250-275° F. or 121-135° C.) to cause co-polymerizing and annealing of the treatment chemicals into a semi-crystalline configuration, with the fluorocarbon side chains oriented (aligned) in a linear fashion. Perfluoro side-chain adhesion to the surface of the foam cellular struts occurs through intermediary non-fluorinated polar and bond group chemical species, typically acrylic, vinyl or urethane. The bond group connects the perfluoro moiety to a polar group, which in turn provides solubility and attachment to the foam cell strut. Film formation, spreading and wetting of the surfaces results in hydrophobation and oleophobation of the foam surfaces.

Polysiloxane treatment chemicals may be applied with a bridging (or "coupling") agent that in turn bonds with the strut surfaces of the foam. In general, the treatment chemical should therefore be selected for the particular property (or properties) to be imparted to the polyimide foam.

Exemplary embodiments of treatment chemicals that introduce hydrophobicity and oleophobicity in treated polyimide foam include, but are not limited to solution, stable aqueous emulsion and aqueous dispersion type fluorinated hydrocarbons (optimally 5-8 fluorocarbon chain), such as fluoroalkyl esters, perfluoroacrylates, fluorinated acrylate plus vinylidene chloride, modified PTFE dispersions, aqueous dispersions of fluorinated urethanes, etc. Some suppliers/brands of fluorinated hydrocarbons for this purpose are (Company/trademark): Daikin/Unidyne™ BASF/Persistol®, Bayer AG/Baygard®, Dianippon Ink & Chemicals/Dicguard™, Rotta GmBh/Dipolit™, Solvay Solexis/Algoflon® and Dupont Zonyl®, Appollo Chemical Co. LLC./Barpel®.

Exemplary embodiments of treatment chemicals that introduce a hydrophobic property to treated foam include, but are not limited to solution, dispersion and aqueous emulsion type silicones (polysiloxanes, including nonreactive polydimethylsiloxane and reactive polymethylhydrogensiloxane). Some of the suppliers of polysiloxanes for this purpose are Dianippon Ink & Chemicals/Silicone Softer™, Bayer AG/Perlit® SI-SW, Dow Corning/Emulsions, Evonik Industries AG, Goldschmidt GmBh/Sitren® and Degussa Goldschmidt AG.

Treatment chemicals may be applied to the foam in a variety of processes used to coat the surfaces of open cell foams. Non-limiting foam treatment techniques include a process that has the steps of dipping, nipping and drying the foam; and plasma coating.

A non limiting example of an embodiment of a batch-type foam treatment process 100 is set forth in FIG. In process step 110 the pieces of foam to be treated may each be "pre-flexed," if necessary. "Pre-flexing" means compressing the foam such that its compressed thickness is reduced to less than about 50% of its original thickness and then releasing compressive force to allow the foam to recover. The foam pieces are then each subjected to chemicals absorption, in process 120. In this example, the treatment chemical is dissolved dispersed, or emulsified in a carrier fluid to produce a chemical treatment fluid. The chemical treatment fluid may also include additives such as flame retardants, adhesion promoters, UV radiation absorbers, and other additives as may be required for a particular intended application of the treated foam product. During chemicals absorption, which may take place in a container of the chemical treatment fluid, the foam pieces may be subjected to successive cycles of compression and relaxation to draw the chemical treatment fluid into the open cells of the foam to ensure wetting of internal open cell surfaces with the chemical treatment fluid. The cyclic compression and relaxation may be induced by mechanically pressing down onto a foam piece and releasing, or may be achieved by pressure cycling within a closed container of the chemical treatment fluid, or by another technique. After several cycles of compression and relaxation, the wetted foam may be transferred for expulsion of excess chemical treatment fluid, in process 130. The removal of excess chemical treatment fluid may be by squeezing the wetted foam to push excess chemical treatment fluid out of the open cells of the wetted foam. This may be achieved by feeding the wetted foam between a pair or pairs of nip rollers, for example. It may also be achieved by subjecting the wetted foam to controlled suction forces that have the effect of "sucking" excess fluid from the wetted foam.

An exemplary embodiment may require several cycles of chemicals absorption (process 120) followed by excess chemical expulsion (process 130) to achieve substantially complete coverage of open cell surfaces with the treatment chemical. Accordingly, once the number of cycles necessary is determined, the treatment process 100 may include a "number of cycles check" feature for each discrete piece of foam being treated. This cycle check feature of process 140 may both sense and determine the number of cycles a particular piece of foam has been subjected to chemicals absorption followed by excess chemical expulsion. If the number of cycles meets a preset required number of cycles, the piece of foam passes on to drying, in process 150. If the number of cycles is less than the preset number of cycles, the piece of foam is returned to chemicals absorption, in process 120. The piece of foam then continues the cycle from thence to excess chemicals expulsion in process 130, until the preset number of cycles (processes 120, 130) is met.

During chemical absorption in process 120, treatment chemicals in the chemical treatment fluid are transferred to the foam open cell surfaces. Thus, the treatment chemicals are gradually depleted from the chemical treatment fluid. In addition, wetted foam pieces that proceed to the drying process 150 entrain at least some carrier fluid that is lost through evaporation in the drying process. Of course, such evaporated carrier fluid may be recovered and recycled, if necessary or desirable. Accordingly, sensors may be used in process 210 to determine parameters of the chemical treatment fluid in the container wherein the chemical absorption process 120 takes place. These sensors may include a chemical treatment fluid level sensor to detect a decline in such levels. In process 220, the sensed level is compared to a preset minimum level. If the fluid level has declined to the preset minimum level or below it, carrier fluid may be replenished in process 230. The sensors of process 210 may also include chemical sensors that provide a variety of functions, such as for example detecting the relative concentration or presence of the treatment chemical in the chemical treatment fluid, and the concentration or presence of adhesion promoters, flame retardants, and other additives of the chemical treatment fluid. The treatment chemical and additives may also be automatically replenished in process 230 when sensed levels drop to or below a preset concentration or other indicator of presence.

In an exemplary embodiment of the drying process, the treated foam product may be dried at a temperature between about 80° C. to about 120° C. for about 1 to about 5 hours. This may be followed by about 1 hour at a temperature between about 120° C. and about 180° C.

An exemplary chemical treatment fluid that may be used in the process exemplified above includes a sufficient presence of the treatment chemical either as a dispersed emulsion in a carrier fluid, or as a solute or as a dispersion so that surfaces of the open cells may be exposed to the treatment chemical to allow attachment of the treatment chemical to the surface within a reasonable number of cycles of compression and relaxation. This does not necessarily require high concentration or presence of the treatment chemical in the carrier fluid. For example, if the treatment chemical is perfluoroacrylate or polysiloxane, and the carrier is water, an emulsion of from about 0.1 wt. % to about 5 wt. % perfluoroacrylate is suitable and useful. Optimal bath concentrations of treatment chemicals may be determined experimentally through process trials. To minimize the addition of dry chemical weight and retain the highest level of fire resistance properties of the treated foam, the concentration may be in the range of 0.25-1 wt %.

After wet chemical treatment, the foam should be heated to dry the impregnation chemicals. Drying time and temperature is dependant upon the size and thickness of the foam, the treatment chemical, bath additives and the carrier fluid to be evaporated. The optimal time/temperature curing profile may be determined experimentally through process trials. Typically, treated parts should be dried in a forced air oven (batch or continuous conveyor) using a prescribed time/temperature envelope. For example, both one and two inch thick sheets of treated polyimide foam of dimensions 24 inches (610 mm) long×24 inches (610 mm) wide, were dried for 2-3 hours at 80° C., followed by a 30-60 minute high temperature bake at 120° C. to cure any residual chemical and to permit acquisition of the desired water and oil repellency properties.

Fluorocarbon-treated polyimide foam samples subjected to multiple hot/wet testing or submersion cycles exhibited a reduction in repellency properties. However, subsequent heating (an hour or less at the drying temperatures) had a restorative affect on these repellency properties.

If foam dimensions are to be retained, then an exemplary process is to treat the raw material (foam bun, etc.) in sequence by pre-flexing, impregnating and drying, then machining the parts to the desired net shape. This will provide more dimensional stability to the final part vs. net shaping before flexing, treating and drying.

Another exemplary polyimide foam treatment technique for OWR may include plasma polymerization. This is a dry, more environmentally friendly method of coating a surface of a material or altering surface properties of a material. Generally, plasma polymerization is performed in a low pressure, low temperature plasma reactor. Plasma is, of course, a partially-ionized gas containing ions, electrons, atoms and other species. To be able to ionize the gas in a controlled and qualitative way the process is carried out under vacuum conditions. The polyimide foam product to be treated is placed in a suitably configured and sized vacuum vessel that is pumped down to a base pressure in the range of 10-2 to 10-3 mbar with the use of high vacuum pumps. This vacuum also pulls air from the open cells of the foam product. A gas, such as a perfluorocarbon or polysiloxane, is then introduced in the vessel and ionized using a high frequency generator to induce plasma formation. The highly reactive plasma species react with the surfaces of the open cells and the outer surface of the foam product to form a coating or to alter the surface properties.

In general, plasma species bonds to the surfaces of the open cells and the outer surfaces of the polyimide foam product to form a thin nano-layer on these surfaces. This nano-layer is so thin as not to affect the other properties of polyimide foam, such as acoustic and thermal insulation properties, for example.

The following examples are non-limiting and are intended to illustrate aspects of embodiments of the present technology.

EXAMPLES

Water repellency was evaluated by subjecting three treated (up to one volume % FC treatment) samples to AATCC Test Method 193-2005, *Aqueous Liquid Repellency Test*. Treated polyimide foam samples were assessed as hydrophobic if five drops of AATCC Repellency Grade Number 5, 50:50/Water:Isopropyl Alcohol (volume:volume) evidenced a well-rounded dome (high contact angle) per FIG. 1, Grading Examples A & B (as shown in the AATCC test method). Testing was performed at room temperature. The AATCC repellency grade is the numerical value of the highest numbered test liquid that will not wet the foam within a period of 10+/−2 seconds Oil repellency was evaluated by subjecting three treated (up to one volume % FC treatment) samples to AATCC Test Method 118-2002 *Oil Repellency: Hydrocarbon Resistance Test*. Treated polyimide foam samples were assessed as oleophobic if five drops of AATCC Oil Repellency Grade Number 6 (n-decane) evidenced a well-rounded dome (high contact angle) per FIG. 1, Grading Example A & B (as shown in the AATCC test method). Testing was performed at room temperature. The AATCC repellency grade is the numerical value of the highest numbered test liquid that will not wet the foam within a period of 30+/−2 seconds.

Treated samples were subjected to 1000 hours of hot/wet (70° C./97% RH) testing (similar to ASTM D 2126) with little appreciable weight gain compared to untreated samples.

Hydrophobated polyimide foam (up to one volume % FC treatment) samples were subjected to aircraft insulation fire test protocols (engineering screening evaluations—not Boeing qualification or FAA certification), including radiant panel flammability, toxic gas generation, smoke density and vertical burn. In each case, the treated polyimide foam met the requirements of those tests.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A product comprising:
a chemically treated thermal and acoustic insulation polyimide foam product comprising:

an open cell polyimide foam substrate, the open cell polyimide foam substrate having an interior surface area; and a treatment chemical on at least a portion of the interior surface area, the treatment chemical bonded to at least a portion of the interior surface by a non-fluorinated polar group, said polar group connected to a bond group which is connected to a fluorinated hydrocarbon chain containing between 5 and 8 carbon atoms to render the interior surface hydrophobic and oleophobic said interior surface area comprising said polyimide, wherein the treatment chemical is a copolymer comprising a perfluoroacrylate and a co-monomer, the co-monomer being an ester of alkyl or a substituted alkyl group containing acrylic acid or a methacrylic acid.

2. The product of claim 1, wherein the treatment chemical further comprises a side chain group comprising at least one of vinyl and urethane.

3. The product of claim 1, wherein the treatment chemical further comprises a polysiloxane.

4. A method of treating an open cell polyimide foam, the method comprising the steps of:

compressing a polyimide foam product to less than approximately 50% of its original thickness, the polyimide foam product having an exterior surface area and an open cell structure, the open cell structure comprising an interior surface area of the foam product;

wetting the exterior surface area and the interior surface area of the polyimide foam product with a chemical treatment fluid comprising an aqueous emulsion of a treatment chemical, the treatment chemical comprising a perfluroacryalte comprising a hydrocarbon chain containing between 5 and 8 fluorinated carbon atoms, wherein a concentration of the treatment chemical in the aqueous emulsion is between about 0.1% to about 5% by weight;

heating the polyimide foam after wetting with perfluoroacrylate to cause co-polymerizing and annealing of the treatment chemicals into a semi-crystalline configuration;

drying the polyimide foam product at a first temperature; and baking the polyimide foam product at a second temperature higher than the first temperature.

5. The method of claim 4 wherein the concentration of the treatment chemical is between about 0.25% to about 1% by weight.

6. The method of claim 4 wherein the drying comprises heating of between about 2-3 hours at a temperature of at least about 80 degrees C.

7. The method of claim 4, wherein the baking comprises heating of between about 30-60 minutes at a temperature of at least about 120 degrees C.

8. The method of claim 4, wherein the treatment chemical further comprises a polysiloxane.

9. The method of claim 4, the treatment chemical is a copolymer comprising the perfluoroacrylate and a co-monomer, the co-monomer being an ester of alkyl or a substituted alkyl group containing acrylic acid or a methacrylic acid.

10. The method of claim 4, wherein the heating comprises heating at a temperature of between about 121 to about 135 degrees C.

* * * * *